United States Patent
Peters et al.

(10) Patent No.: US 10,371,089 B2
(45) Date of Patent: Aug. 6, 2019

(54) SYSTEM FOR ACTUATING AN EXHAUST COWL

(71) Applicant: United Technologies Corporation, Hartford, CT (US)

(72) Inventors: Donald W. Peters, Colchester, CT (US); James P. Bangerter, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 473 days.

(21) Appl. No.: 14/600,824

(22) Filed: Jan. 20, 2015

(65) Prior Publication Data
US 2016/0208737 A1 Jul. 21, 2016

(51) Int. Cl.
| | |
|---|---|
| F02K 1/06 | (2006.01) |
| F02C 3/10 | (2006.01) |
| F01D 25/24 | (2006.01) |
| F16H 21/04 | (2006.01) |
| F16H 21/54 | (2006.01) |
| F02K 1/09 | (2006.01) |

(Continued)

(52) U.S. Cl.
CPC .............. *F02K 1/06* (2013.01); *F01D 25/24* (2013.01); *F02C 3/10* (2013.01); *F02K 1/09* (2013.01); *F16H 21/04* (2013.01); *F16H 21/54* (2013.01); *F02K 1/10* (2013.01); *F02K 1/1261* (2013.01); *F02K 1/15* (2013.01)

(58) Field of Classification Search
CPC ..... F02K 1/09; F02K 1/06; F02K 1/15; F02K 1/1261; F02K 1/10; F02K 3/077
See application file for complete search history.

(56) References Cited

U.S. PATENT DOCUMENTS

| | | | | |
|---|---|---|---|---|
| 2,811,831 A | * | 11/1957 | Geary | F02K 1/1207 239/265.39 |
| 3,289,946 A | * | 12/1966 | Lennard | F02K 1/08 239/265.39 |

(Continued)

FOREIGN PATENT DOCUMENTS

| | | | | |
|---|---|---|---|---|
| EP | 1619376 | | 1/2006 | |
| GB | 1008322 A | * | 10/1965 | ............... F02K 1/09 |
| WO | 2013192063 | | 12/2013 | |

OTHER PUBLICATIONS

Extended European Search Report dated Jun. 23, 2016 in European Application No. 15194546.6.

*Primary Examiner* — William H Rodriguez
*Assistant Examiner* — Thomas P Burke
(74) *Attorney, Agent, or Firm* — Snell & Wilmer L.L.P.

(57) ABSTRACT

In various embodiments, a cowl actuation system may comprise a cowl, an actuator, a bell crank, and a guide arm. The cowl may be configured to modulate at least a portion of the exhaust flow of a gas turbine engine. The bell crank may have a first end and a second end. The first end may be operatively coupled to the actuator. The second end may be operatively coupled to the cowl. The bell crank may be configured to pivot about a first point located between the first end and the second end. The first point may also be located along a diameter. The guide arm may have a third end and a fourth end. The third end may be mounted to a second point. The fourth end may be operatively coupled to the cowl. The second point may be located along the diameter.

16 Claims, 4 Drawing Sheets

(51) Int. Cl.
*F02K 1/15* (2006.01)
*F02K 1/12* (2006.01)
*F02K 1/10* (2006.01)

(56) References Cited

U.S. PATENT DOCUMENTS

| | | | | |
|---|---|---|---|---|
| 3,598,318 | A | * 8/1971 | Schiel | F02K 1/06 239/265.13 |
| 4,043,509 | A | 8/1977 | McHugh et al. | |
| 4,080,785 | A | * 3/1978 | Koff | F02K 3/077 415/69 |
| 5,261,227 | A | * 11/1993 | Giffin, III | F01D 17/162 60/226.1 |
| 6,378,781 | B1 | * 4/2002 | Vicario | F02K 1/008 239/265.39 |
| 2008/0155960 | A1 | * 7/2008 | Hauer | F02K 1/08 60/226.2 |
| 2009/0208328 | A1 | * 8/2009 | Stern | F02K 1/002 415/145 |
| 2010/0115914 | A1 | * 5/2010 | Levasseur | F02K 1/08 60/204 |
| 2010/0162684 | A1 | * 7/2010 | Baker | F02K 1/15 60/226.3 |
| 2011/0271685 | A1 | * 11/2011 | West | F02K 1/08 60/771 |
| 2012/0321448 | A1 | * 12/2012 | Pesyna | F02K 3/077 415/145 |
| 2015/0113941 | A1 | * 4/2015 | Buey | F02K 3/077 60/204 |
| 2015/0129676 | A1 | * 5/2015 | Pesyna | F02K 1/1207 239/11 |

\* cited by examiner

SYSTEM FOR ACTUATING AN EXHAUST COWL

GOVERNMENT LICENSE RIGHTS

These inventions were made with government support under FA-8650-09-D-2923-0021 awarded by The United States Air Force. The government has certain rights in the inventions.

FIELD

The present disclosure relates to systems for actuating an exhaust cowl, and more particularly, to systems for creating and/or controlling exhaust flow by actuating an exhaust cowl.

BACKGROUND

Typical cowl actuation systems make use of actuators that are installed at particular locations, such as, for example, the 3 o'clock position and the 9 o'clock position about the diameter of the gas turbine engine. The actuators may be installed at these locations to uniformly load the cowl. However, as the design of gas turbine engines changes to improve operating efficiency, the installation envelope for the actuators may be limited or eliminated.

SUMMARY

In various embodiments, an actuation system may comprise an actuator, a bell crank, and a guide arm. The bell crank may be operatively coupled to the actuator. The bell crank may be configured to pivot about a first point. The first point may be located along a diameter. The guide arm may have a first end and a second end. The first end may be configured to pivot about a second point. The second point may be located along the diameter.

In various embodiments, a gas turbine engine may comprise a fan, a compressor, a combustor, a turbine, an exhaust, a cowl, and a cowl actuation system. The fan may be configured to create a fan flow. The compressor may be configured to compress gas. The combustor may be in fluid communication with the compressor. The turbine may be in fluid communication with the combustor. The turbine may be configured to drive the fan. The exhaust may be configured to direct a fan flow and the exhaust flow from the turbine. The cowl may be configured to modulate at least a portion of the exhaust. The cowl actuation system coupled to the cowl. The cowl actuation system may comprise an actuator, a bell crank, and a guide arm. The actuator configured to modulate the cowl. The bell crank may have a first end and a second end. The first end may be operatively coupled to the actuator. The second end may be operatively coupled to the cowl. The bell crank may be configured to pivot about a first point. The first point may be located between the first end and the second end. The first point may be located along a diameter. The guide arm may have a third end and a fourth end. The third end may be mounted to a second point. The fourth end may be operatively coupled to the cowl. The second point may be located along the diameter.

In various embodiments, a cowl actuation system may comprise a cowl, an actuator, a bell crank, and a guide arm. The cowl may be configured to modulate at least a portion of the exhaust flow of a gas turbine engine. The bell crank may have a first end and a second end. The first end may be operatively coupled to the actuator. The second end may be operatively coupled to the cowl. The bell crank may be configured to pivot about a first point located between the first end and the second end. The first point may also be located along a diameter. The guide arm may have a third end and a fourth end. The third end may be mounted to a second point. The fourth end may be operatively coupled to the cowl. The second point may be located along the diameter.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
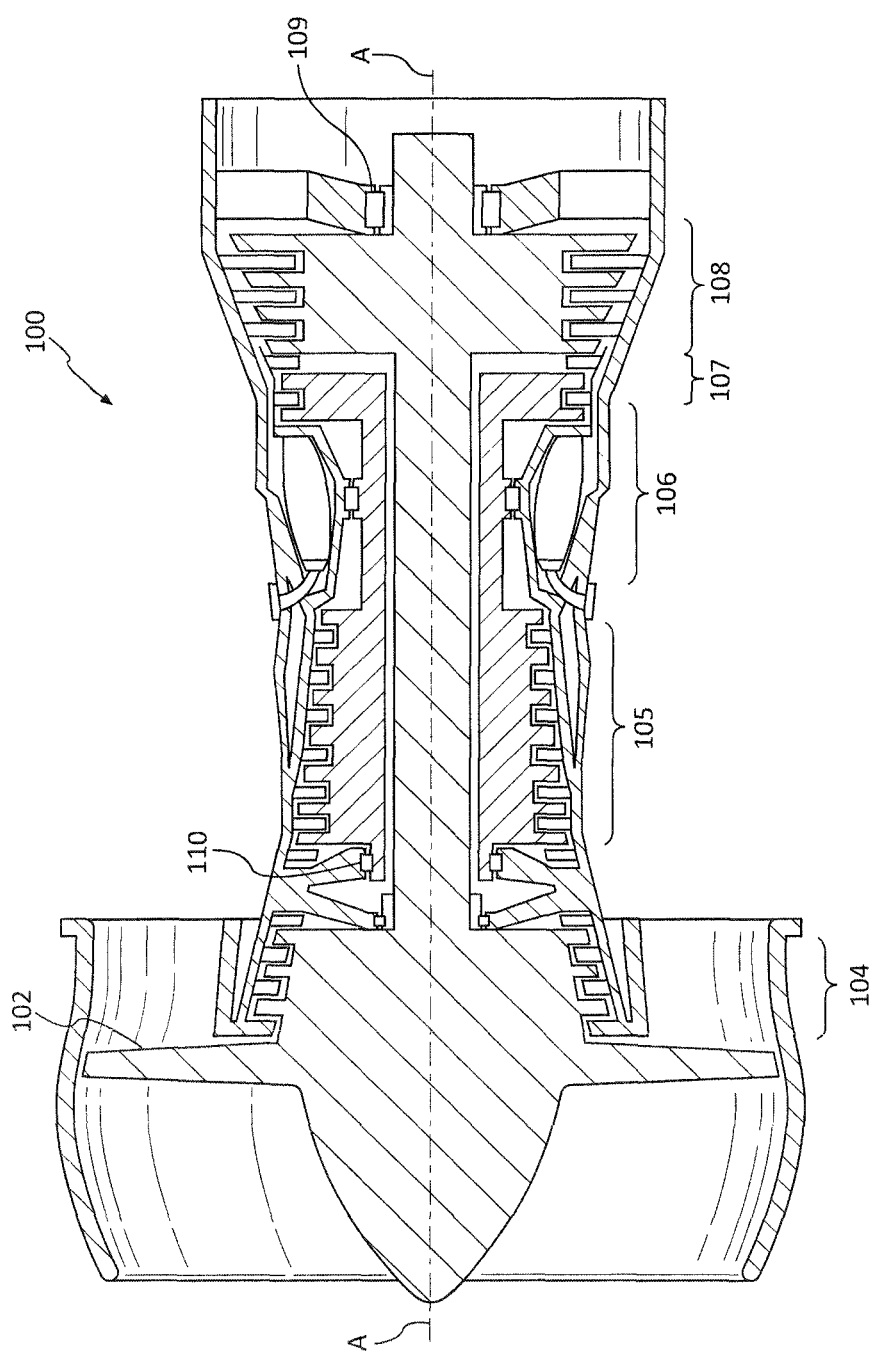
FIG. 1 illustrates cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis A-A, which may also be referred to as axis of rotation A-A. Gas turbine engine 100 may comprise a fan 102, compressor sections 104 and 105, a combustion section 106, and turbine sections 107, 108. Air compressed in the compressor sections 104, 105 may be mixed with fuel and burned in combustion section 106 and expanded across the turbine sections 107, 108. The turbine sections 107, 108 may include high pressure rotors and low pressure rotors, which rotate in response to the expansion of air. The turbine sections 107, 108 may comprise alternating rows of rotary airfoils or blades and static airfoils or vanes. Cooling air may be supplied to the turbine sections 107, 108 from the compressor sections 104, 105. A plurality of bearings including, for example, bearings 109, bearings 110 and/or the like, may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation A-A. For example, fan 102 may be referred to as forward of turbine section 107 and turbine section 107 may be referred to as aft of fan 102. Typically, during operation of gas turbine engine 100, air flows from forward to aft, for example, from fan 102 to turbine section 107. As air flows from fan 102 to the more aft components of gas turbine engine 100, axis of rotation A-A may also generally define the direction of the air stream flow. It should be understood, however, that the above parameters are exemplary of various embodiments of a suitable geared architecture engine and that the present disclosure contemplates other gas turbine engines including direct drive turbofans.

Figure 2:
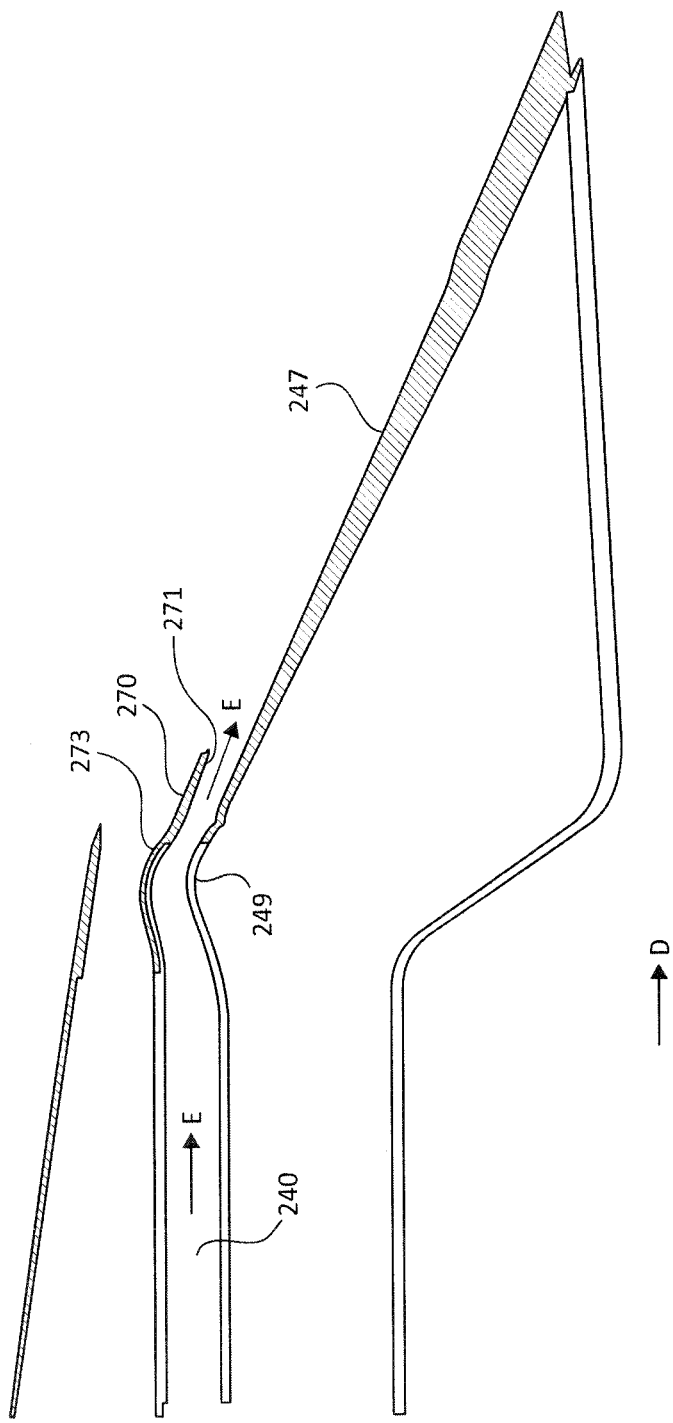
FIG. 2 illustrates a schematic cross-sectional view of an exhaust of a gas turbine engine, in accordance with various embodiments.

In various embodiments and with reference to FIG. 2, exhaust from the engine core and fan of the gas turbine engine are exhausted as main nozzle flow D. Main nozzle flow D travels generally down the center line A-A of the gas turbine engine in the aft direction and is directed and/or channeled by exhaust cowl 247. A third stream flow E may be exhausted in a channel 240 that is defined outboard of exhaust cowl 247. This third stream flow may be modulated to improve the overall efficiency of the gas turbine engine. For example, third stream flow E may be activated in response to the gas turbine engine operating in a cruise condition and/or where the fuel efficiency of the gas turbine engine can be increased, improved or optimized. Third stream flow E may be activated and/or modulated by changing the relative distance between exhaust cowl 247 and cowl 270. Channel 240 configured to carry third stream flow E may be defined between exhaust cowl 247 and the exterior surface of the nacelle of the gas turbine engine (not shown).

In various embodiments, third stream flow E may be modulated by changing the relative distance between cowl 270 and exhaust cowl 247. In this regard, exhaust cowl 247 may comprise a bump 249. Cowl 270 may comprise a corresponding bump 273. When cowl 270 is actuated from the closed position to the open position, cowl 270 may translate approximately 1.5 inches (approximately 3.81 centimeters) to approximately 4 inches (approximately 10.16 centimeters) aft. This translation is also relative to exhaust cowl 247 and/or a static structure of the gas turbine engine. The translation of cowl 270 from the closed position to the open position allows cowl 270 and, more particularly, inner surface 271 of cowl 270 to translate aft and move away from bump 249. This allows channel 240 carrying third stream flow E to open and third stream flow E to exhaust aft. Moreover, bump 273 may be translated aft to define a substantially uniform flow path. In this regard, the distance between bump 249 and bump 273 may be substantially similar to distance between the upstream walls defining channel 240.

Figure 3:
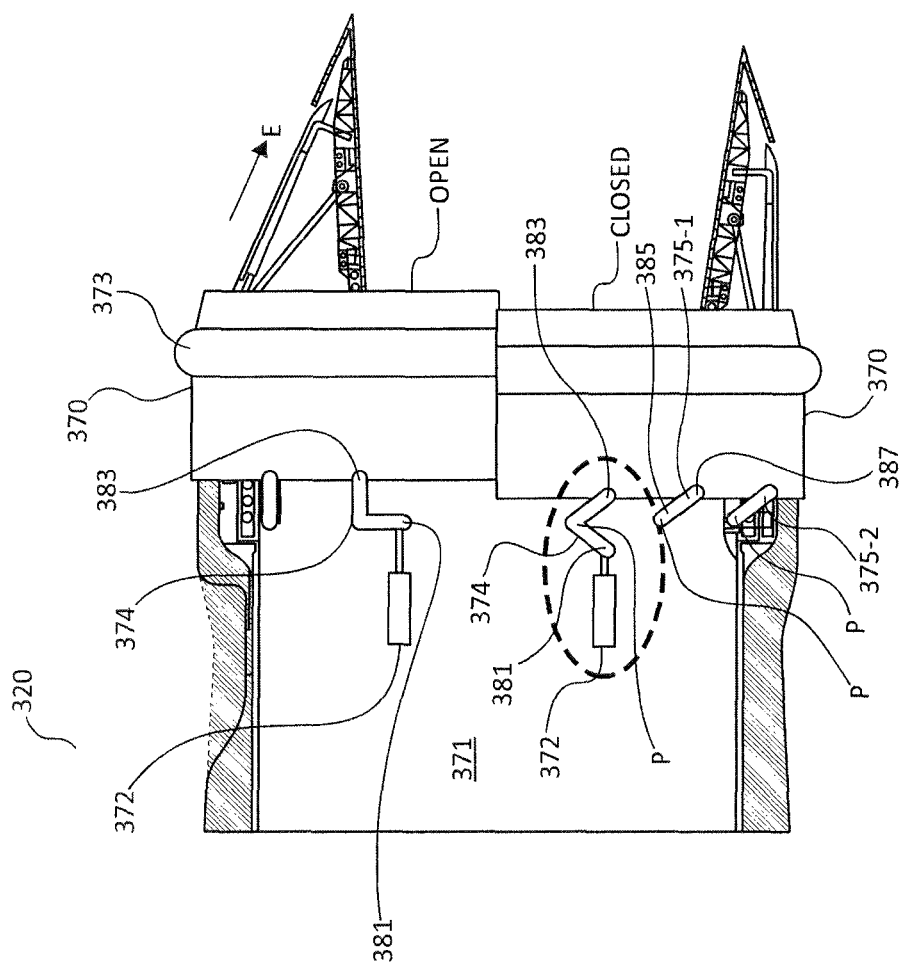
FIG. 3 illustrates a cross-sectional view of a gas turbine engine showing a portion of a cowl in an open configuration and a portion of a cowl in a closed configuration, in accordance with various embodiments.

In various embodiments and with reference to FIG. 3, cowl 370 is depicted in both an open and closed configuration (as labeled in FIG. 3). Cowl 370 may be actuated between the open and closed configurations via an actuation system 371. Actuation 10 system 371 may comprise an actuator 372 and a bell crank 374. Actuator 372 may be coupled to bell crank 374. Bell crank 374 may have a first end 381 and a second end 383. Bell crank 374 may also be configured to pivot between a closed position (e.g., a first position) and an open position (e.g., a second position) about a pivot point P in response to an input or load from actuator 372. Pivot point P may be located between 15 the first end 381 and the second end 383 of bell crank 374. Pivot point P may be further located on a diameter of a gas turbine engine 320.

In various embodiments, actuation system 371 may further comprise a plurality of guide arms 375, shown as guide arm 375-1 and guide arm 375-2 in FIG. 3. Guide arms 375 may have a pivot point P that is circumferentially aligned with the pivot point P of bell crank 374. In this regard, the one or more pivot points P associated with the guide arms 375 and/or bell crank 374 may be located along substantially the same diameter of gas turbine engine 320.

In various embodiments, bell crank 374 may have an angled configuration. For example, bell crank may have an angle such that is configured to cause a determined or known amount of axial motion (e.g., motion along axis A-A of gas turbine engine 120 as shown in FIG. 1) and circumferential motion (e.g., circular motion about axis A-A of gas turbine engine 120 as shown in FIG. 1). In this regard, the motion of the bell crank 374 about pivot point P in response to a load from actuator 372 may cause cowl 373 to translate both axially and circumferentially. The total axial translation of cowl 373 between the closed position and the open position may be approximately 1.5 inches (approximately 3.81 centimeters) to approximately 4 inches (approximately 10.16 centimeters). However, the total distance of translation may be any suitable distance based on the overall geometry of the gas turbine engine 320 where the cowl 373 and actuation system 371 are being implemented. Moreover, the total circumferential translation may be between approximately 20 degrees and approximately 35 degrees. However, like the axial translation, the circumferential translation may be any suitable circumferential translation depending on the geometry of gas turbine engine 320, cowl 373, and/or actuation system 371.

In various embodiments, one or more guide arms 375 may be substantially straight. Guide arms 375 may comprise first ends 385 and second ends 387. First ends 385 may be separately coupled to various pivot points P along a diameter of gas turbine engine 320, as discussed herein. Second ends 387 of guide arms 375 may be coupled to cowl 370 (e.g., a common structure). Guide arms 375 may be configured to translate cowl 370 circumferentially and axially in a manner that is consistent with bell crank 374. In this regard, the pivot points of bell crank 374 and guide arms 375 may be commonly aligned along a diameter associated with gas turbine engine 320 so that the path of translation of cowl 370 by bell crank 374 and guide arms 375 is substantially uniform and/or consistent.

In various embodiments, actuation system 371 may comprise a single actuator 372. Actuation system 371 may also comprise multiple actuators depending on the load requirements to translate cowl 370 and the overall envelope and space available for installation of actuators. In this regard, in a configuration with one actuator 372, the overall weight of actuation system 371 may be reduced when compared to a typical cowl actuation system. Moreover, in a single actuator installation the actuator 372 of actuation system 371 may be located at any point around the diameter of gas turbine engine 320.

Figure 4:
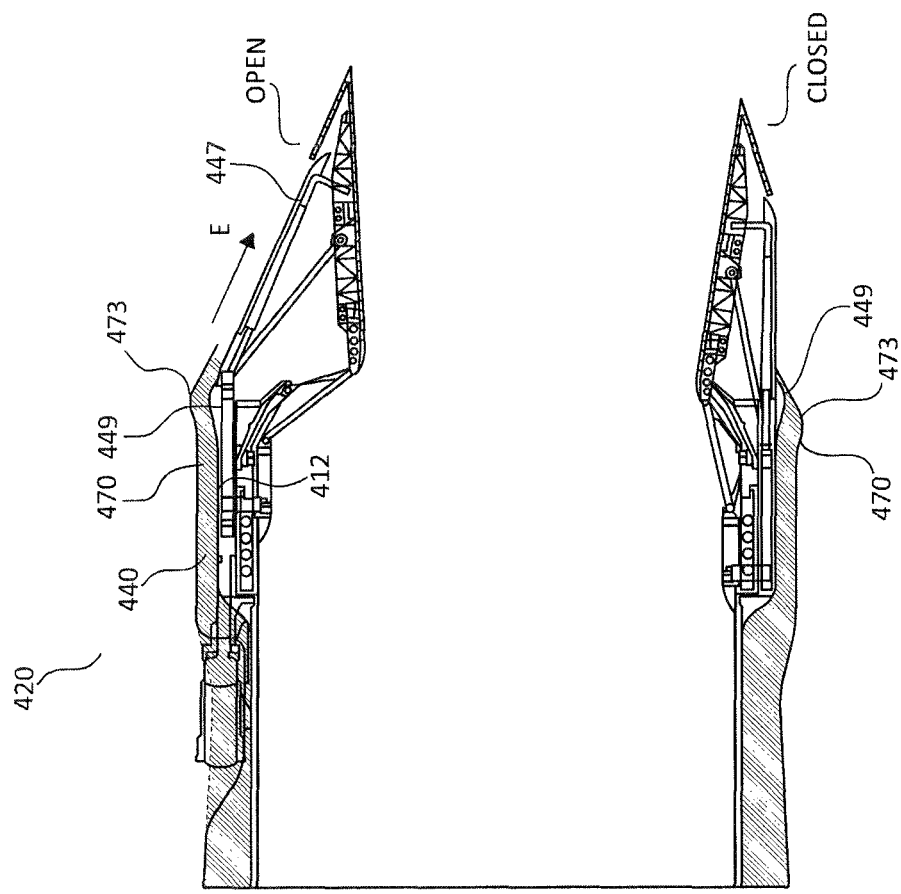
FIG. 4 illustrates a cross-sectional view of a gas turbine engine showing a third stream flow corresponding to a cowl in an open configuration and a third stream flow corresponding to a cowl in a closed configuration, in accordance with various embodiments.

In various embodiments and with reference to FIG. 4, gas turbine engine 420 and, more specifically, cowl 470 (shown and labeled in cross-section in FIG. 4) is shown in an open configuration and a closed configuration as labeled. In the closed configuration, cowl 470 is translated forward such that an interior surface of cowl 470 contacts bump 449 of exhaust cowl 447. In the open configuration, cowl 470 may be translated aft causing the interior surface of cowl 470 to translate away from bump 449. In this regard, channel 440 is defined between cowl 470 and exhaust cowl 447 and/or gas turbine engine static structure 412 (e.g., the turbine case) allowing third stream flow E to translate aft between exhaust cowl 447 and cowl 470. Moreover, cowl 470 comprises a bump 473 with a geometry that corresponds to bump 449. As such, when cowl 470 is translated aft, bump 473 aligns with bump 449 defining channel 440 as a uniform flow channel for third stream flow E. Moreover, third stream flow E may be open or closed regardless of and/or independently of the position (e.g., open or closed) of the main nozzle of the gas turbine engine.

In various embodiments, the cowl actuation systems defined herein may be used in any suitable application and/or on any suitable engine. Moreover, the cowl actuation systems defined herein may be used to modulate any cowl and control and/or modulate any flow. More specifically, the systems and methods described herein may be described in the context of modulating third stream flow. However, it should be understood that the cowl actuation systems described herein may be used to modulate any cowl and/or any corresponding flow.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   an exhaust cowl that is adjustable and is configured to direct a main exhaust from a turbine section of the gas turbine engine;
   an outer cowl disposed outboard of the exhaust cowl of the gas turbine engine, wherein an annular flow path is defined between the exhaust cowl and the outer cowl, wherein the outer cowl is configured to modulate an annular exhaust flow through the annular flow path;
   an actuator;
   a bell crank operatively coupled in load transferring communication between the actuator and the outer cowl, the bell crank configured to pivot about a first point, the first point located along a circumference; and
   a guide arm coupled to the outer cowl, wherein the guide arm is not directly coupled to the bell crank, the guide arm having a first end and a second end, the first end configured to pivot about a second point, wherein the second point is located along the circumference such that the first point and the second point are axially fixed and commonly aligned along the circumference, wherein the guide arm is not coupled in load transferring communication between the actuator and the outer cowl, wherein movement of the outer cowl is caused by load transfer from the actuator through the bell crank;
   wherein the outer cowl is configured to rotate circumferentially and translate axially.

2. The gas turbine engine of claim 1, wherein the outer cowl is configured to translate from a closed position to an open position.

3. The gas turbine engine of claim 1, wherein the outer cowl is actuated from a closed position to an open position to control an annular exhaust flow and in response to the actuator pivoting the bell crank from a first position to a second position.

4. The gas turbine engine of claim 1, wherein the outer cowl defines a first bump and wherein a static structure of the exhaust cowl defines a second bump.

5. The gas turbine engine of claim 4, wherein where the outer cowl is in the open position the first bump is spaced relative to the second bump to provide a first section of the annular flow path that has a first radial dimension that is substantially uniform with a second radial dimension of a second section of the annular flow path that is upstream of the first section, the first bump, and the second bump.

6. The gas turbine engine of claim 5, wherein an interior surface of the outer cowl is configured to contact the second bump to seal the flow path.

7. The gas turbine engine of claim 1, wherein the bell crank and the guide arm are coupled to a common structure.

8. The gas turbine engine of claim 7, wherein the actuator causes the bell crank to pivot from a first position to a second position which also causes the guide arm to actuate from a third position to a fourth position.

9. The gas turbine engine of claim 8, wherein the common structure moves axially and rotates circumferentially in response to the bell crank pivoting between the first position and the second position.

10. A gas turbine engine, comprising:
a fan configured to create a fan flow;
a compressor configured to compress gas;
a combustor in fluid communication with the compressor;
a turbine in fluid communication with the combustor, the turbine configured to drive the fan;
an exhaust cowl that is adjustable and is configured to direct a main exhaust from the turbine;
an outer cowl disposed outboard of the exhaust cowl, wherein an annular flow path is defined between the exhaust cowl and the outer cowl, wherein the outer cowl is configured to modulate an annular exhaust flow through the annular flow path; and
a cowl actuation system coupled to the outer cowl and comprising:
an actuator configured to modulate the outer cowl,
a bell crank having a first end and a second end, the first end operatively coupled to the actuator and the second end operatively coupled to the outer cowl such that the bell crank is coupled in load transferring communication between the actuator and the outer cowl, the bell crank configured to pivot about a first point located between the first end and the second end, the first point located along a circumference, and
a guide arm having a third end and a fourth end, the third end mounted to a second point and the fourth end operatively coupled to the outer cowl, wherein the guide arm is not directly coupled to the bell crank, wherein the second point is located along the circumference such that the first point and the second point are axially fixed and commonly aligned along the circumference, wherein the guide arm is not coupled in load transferring communication between the actuator and the outer cowl such that the guide arm pivots in response to movement of the outer cowl, wherein movement of the outer cowl is caused by load transfer from the actuator through the bell crank,
wherein the outer cowl is configured to rotate circumferentially and translate axially.

11. The gas turbine engine of claim 10, wherein the outer cowl is actuated from a closed position to an open position to actuate the annular exhaust flow and in response to the actuator pivoting the bell crank from a first position to a second position.

12. The gas turbine engine of claim 11, wherein the outer cowl defines a first bump, wherein a static structure of the exhaust cowl defines a second bump, wherein in response to the outer cowl being in the open position the first bump is spaced relative to the second bump to provide a first section of the annular flow path that has a first radial dimension that is substantially uniform with a second radial dimension of a second section of the annular flow path that is upstream of the first section, the first bump, and the second bump.

13. A cowl actuation system, comprising:
an outer cowl configured to modulate an annular exhaust flow of a gas turbine engine, wherein the outer cowl is disposed outboard of an exhaust cowl of the gas turbine engine, wherein an annular flow path is defined between the exhaust cowl and the outer cowl such that the outer cowl is configured to modulate the annular exhaust flow through the annular flow path, wherein the exhaust cowl is adjustable and is configured to direct a main exhaust from a turbine section of the gas turbine engine;
an actuator;
a bell crank having a first end and a second end, the first end operatively coupled to the actuator and the second end operatively coupled to the outer cowl such that the bell crank is coupled in load transferring communication between the actuator and the outer cowl, the bell crank configured to pivot about a first point located between the first end and the second end, the first point located along a circumference; and
a guide arm having a third end and a fourth end, the third end mounted to a second point and the fourth end operatively coupled to the outer cowl, wherein the guide arm is not directly coupled to the bell crank, wherein the second point is located along the circumference such that the first point and the second point are axial fixed and commonly aligned along the circumference, wherein the guide arm is not coupled in load transferring communication between the actuator and the outer cowl such that the guide arm pivots in response to movement of the outer cowl, wherein movement of the outer cowl is caused by load transfer from the actuator through the bell crank.

14. The cowl actuation system of claim 13, wherein the outer cowl is actuated from a closed position to an open position to actuate the annular exhaust flow and in response to the actuator pivoting the bell crank from a first position to a second position.

15. The cowl actuation system of claim 13, wherein the outer cowl defines a first bump, wherein a static structure of the exhaust cowl defines a second bump, wherein in response to the outer cowl being in an open position the first bump is spaced relative to the second bump to provide a first section of the annular flow path that has a first radial dimension that is substantially uniform with a second radial dimension of a second portion of the annular flow path that is upstream of the first section, the first bump, and the second bump.

16. The cowl actuation system of claim 13, wherein the actuator causes the bell crank to pivot from a first position to a second position which also causes the guide arm to actuate from a third position to a fourth position.

* * * * *